(12) United States Patent
Kearl

(10) Patent No.: US 6,869,722 B2
(45) Date of Patent: Mar. 22, 2005

(54) HYBRID THIN FILM/THICK FILM SOLID OXIDE FUEL CELL AND METHOD OF MANUFACTURING THE SAME

(75) Inventor: Daniel A. Kearl, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/698,136

(22) Filed: Oct. 31, 2003

(65) Prior Publication Data

US 2004/0091609 A1 May 13, 2004

Related U.S. Application Data

(62) Division of application No. 09/839,956, filed on Apr. 19, 2001, now Pat. No. 6,677,070.

(51) Int. Cl.[7] .......................... H01M 4/86; H01M 8/10; H01M 2/00; H01M 4/88
(52) U.S. Cl. ............................. 429/44; 429/30; 429/32; 429/40; 29/623.1
(58) Field of Search ............................... 429/30, 32–34, 429/40–42, 44; 29/623.1

(56) References Cited

U.S. PATENT DOCUMENTS

| 4,629,537 A | 12/1986 | Hsu |
| 5,190,834 A | 3/1993 | Kendall |

(List continued on next page.)

FOREIGN PATENT DOCUMENTS

| DE | 1922970 | 12/1969 |
| EP | 516417 A1 | 12/1992 |
| WO | WO94/22178 | 9/1994 |
| WO | WO97/30485 | 8/1997 |
| WO | WO/00/45457 | 8/2000 |

OTHER PUBLICATIONS

T. Tsai, et al., "Bias Sputter Deposition of Dense Yttria–Stabilized Zirconia Films on Porous Substrates," J. Electrochem. Soc., vol. 142, No. 9, Sep. 1995; pp. 3084–3087.

A. Jankowski, et al., "Testing of Solid–Oxide Fuel Cells for Micro to Macro Power Generation," Lawrence Livermore National Laboratory Preprint No. UCRL–JC–134198, May 1999.

A–Q. Pham, et al., Collodial Spray Deposition Technique for the Processing of Thin Film Solid Oxide Fuel Cells, Lawrence Livermore National Laboratory Preprint No. UCRL–JC–135760, Aug. 31, 1999.

J. Will, et al., "Fabrication of thin electrolytes for second-generation solid oxide fuel cells," Solid State Ionics, 131 (2000); pp. 79–96, no month.

P. Charpentier, et al., "Preparation of thin film SOFCs working at reduced temperature," Solid State Ionics, 135 (2000); pp. 373–380, no month.

Primary Examiner—Tracy Dove

(57) ABSTRACT

A SOFC providing higher power densities than PEM-based cells; the possibility of direct oxidation and/or internal reforming of fuel; and reduced SOFC operating temperatures. The SOFC comprises a thin film electrolyte layer. A thick film anode layer is disposed on one surface of the electrolyte layer; and a thick film cathode layer is disposed on the opposite surface of the electrolyte layer. A method of making the SOFC comprises the steps of: creating a well in one side of a dielectric or semiconductor substrate; depositing a thin film solid oxide electrolyte layer on the surface of the well; applying a thick film electrode layer in the electrolyte coated well; creating a counter well in the opposite side of the substrate, the counter well abutting the electrolyte layer; and applying a thick film counter electrode layer in the counter well.

35 Claims, 5 Drawing Sheets

U.S. PATENT DOCUMENTS

| | | | |
|---|---|---|---|
| 5,234,722 A | | 8/1993 | Ito et al. |
| 5,262,021 A | * | 11/1993 | Lehmann et al. ........... 205/655 |
| 5,284,698 A | | 2/1994 | Marshall et al. |
| 5,395,704 A | | 3/1995 | Barnett et al. |
| 5,518,830 A | | 5/1996 | Worrell et al. |
| 5,527,633 A | | 6/1996 | Kawasaki et al. |
| 5,656,387 A | | 8/1997 | Barnett et al. |
| 5,741,406 A | | 4/1998 | Barnett et al. |
| 5,750,013 A | | 5/1998 | Lin |
| 5,783,324 A | | 7/1998 | Binder et al. |
| 5,789,093 A | * | 8/1998 | Malhi ........................ 429/34 |
| 5,968,673 A | | 10/1999 | Aizawa et al. |
| 6,013,386 A | | 1/2000 | Lewin et al. |
| 6,127,058 A | | 10/2000 | Pratt et al. |
| 6,139,985 A | | 10/2000 | Borglum et al. |
| 6,156,448 A | | 12/2000 | Greiner |
| 6,214,485 B1 | | 4/2001 | Barnett et al. |
| 6,232,009 B1 | | 5/2001 | Batawi |
| 6,312,846 B1 | * | 11/2001 | Marsh ........................ 429/30 |
| 6,361,893 B1 | * | 3/2002 | George et al. ................ 429/31 |
| 6,479,178 B2 | | 11/2002 | Barnett |
| 6,509,113 B2 | | 1/2003 | Keegan |
| 6,641,948 B1 | * | 11/2003 | Ohlsen et al. ................ 429/44 |
| 6,677,070 B2 | * | 1/2004 | Kearl ......................... 429/33 |
| 2002/0025458 A1 | | 2/2002 | Faville et al. |
| 2004/0101729 A1 | * | 5/2004 | Kearl ......................... 429/30 |

* cited by examiner

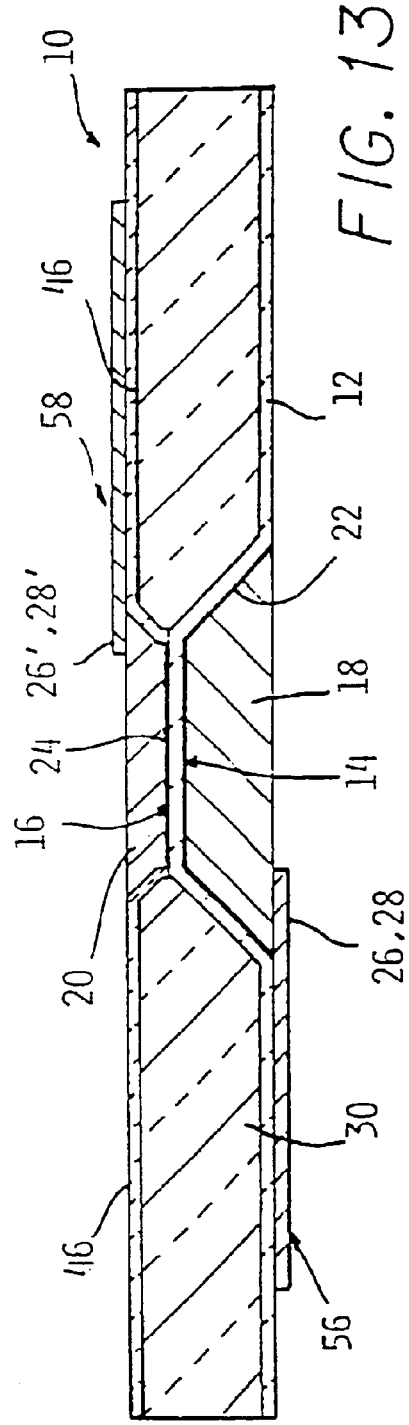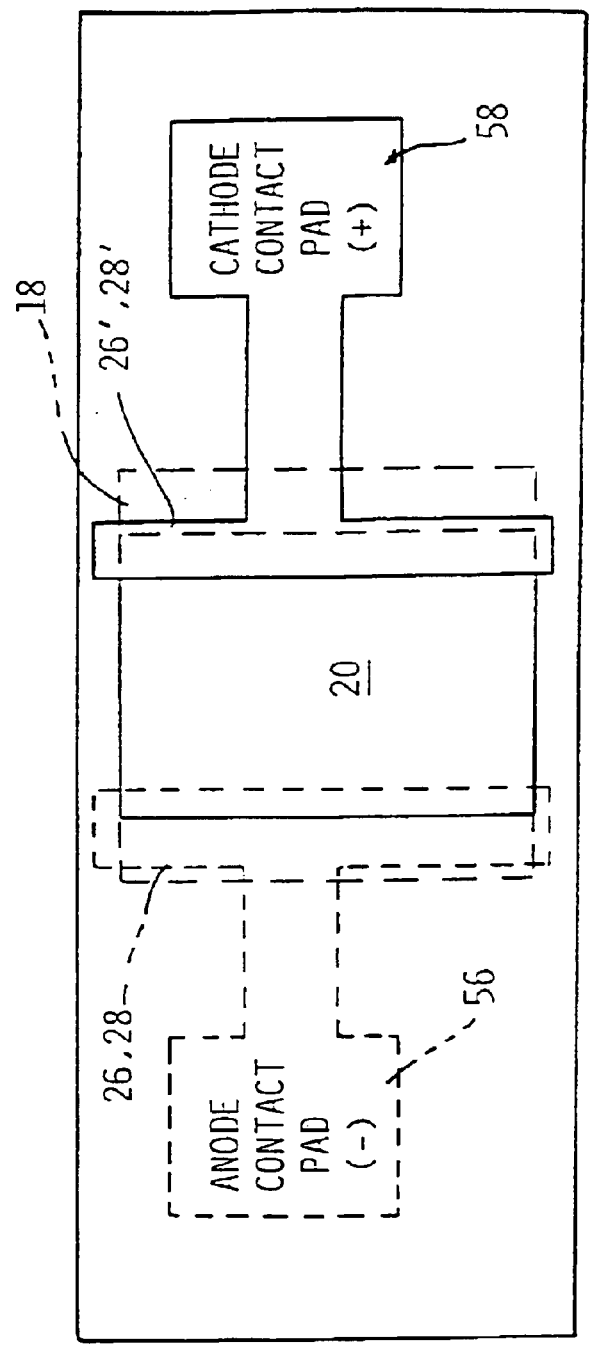

HYBRID THIN FILM/THICK FILM SOLID OXIDE FUEL CELL AND METHOD OF MANUFACTURING THE SAME

CROSS REFERENCE TO RELATED APPLICATIONS

This application is a divisional of application Ser. No. 09/839,956, filed Apr. 19, 2001, now U.S. Pat. No. 6,677,070.

BACKGROUND OF THE INVENTION

The present invention relates generally to solid oxide fuel cells, and more particularly to such fuel cells having thin film electrolytes and thick film electrodes.

There is considerable current research and industrial activity on the development of PEM-based fuel cell systems for Micro-Power applications. The most common PEM systems proposed would use either hydrogen or methanol as a fuel. Hydrogen represents a challenge for fuel handling and distribution. Methanol may be promising in a Direct Methanol PEM fuel cell, but a reduction to commercial practice has not been demonstrated to date. Further, methanol has a relatively low (approximately one half) specific energy as compared to other hydrocarbon fuels such as, for example, butane, propane, gasoline, and diesel. Reported power densities from PEM cells seldom exceed 400 mW/cm2.

Solid Oxide fuel cells (SOFC) have been shown to offer the potential for internal reforming, as well as reported power densities as high as 1900 mW/cm2. A schematic representation of an SOFC is shown in FIG. 1, wherein $V_0^{\circ\circ}$ stands for oxygen vacancy. The oxygen reduction reaction (taking place at the cathode) is:

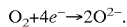

$$O_2 + 4e^- \rightarrow 2O^{2-}.$$

The $O^{2-}$ ion is transferred from the cathode through the electrolyte to the anode. Some typical fuel oxidation reactions (taking place at the anode) are:

$$2H_2 + 2O^{2-} \rightarrow 2H_2O + 4e^- \quad (1)$$

$$2CO + 2O^{2-} \rightarrow 2CO_2 + 4e^- \quad (2)$$

The oxidation reaction at the anode, which liberates electrons, in combination with the reduction reaction at the cathode, which consumes electrons, results in a useful electrical voltage and current through the load.

The application of "thin film" processing techniques has been reported to reduce the practical operating temperature of SOFC from a range of 800° C. to 1100° C., down to about 500° C. or less.

It has also generally been believed that a "thin" electrolyte layer should not be too thin, and thicknesses less than 10 μm have been discouraged in order to avoid the possibility of short circuiting. Some researchers have attempted to provide an improved colloidal deposition technique over the prior technique—prior attempts to use colloidal deposition to deposit films thicker than 10 μm in a single step coating had previously resulted in cracking of the film after drying.

The "thin" film SOFCs are not, however, the SOFCs having the highest demonstrated performance to date. The higher performance/higher power density SOFCs are generally operated at higher temperatures, and use cermets and thick film processes for anode and cathode fabrication. These high performance SOFCs use "thin" film electrolytes; however, these "thin" film electrolytes generally have thicknesses of about 40 μm or more and are fabricated by electrochemical vapor deposition (EVD), tape casting, and other ceramic processing techniques.

A known thin film SOFC 100 is shown in FIG. 2. SOFC 100 comprises a substrate 102 having thereabove a nitride layer 104, a thin film nickel anode 106, a thin film electrolyte 108, and a thin film silver cathode 110.

Some previously known SOFCs have been electrolyte supported (wherein the electrolyte layer provided some structural integrity and was thicker than either the anode or the cathode); cathode supported (wherein the cathode layer provided some structural integrity and was thicker than either the anode or the electrolyte); or anode supported (wherein the anode layer provided some structural integrity and was thicker than either the cathode or the electrolyte).

Fabrication has generally been recognized to be one of the major problems inherent with SOFC. This is due to the fact that all of the components. (anode, cathode, electrolyte, interconnect material, etc.) should be compatible with respect to chemical stability and mechanical compliance (eg. thermal expansion coefficients). The layers also should be deposited such that suitable adherence is achieved without degrading the material due to use of too high a sintering temperature. These requirements have heretofore rendered successful and cost effective production of high performance SOFCs very difficult.

Thus, it would be desirable to provide a SOFC and method of fabricating a SOFC which overcome the above-mentioned drawbacks.

SUMMARY OF THE INVENTION

The present invention addresses and solves the above-mentioned problems and meets the objects and advantages enumerated hereinbelow, as well as others not enumerated, by providing a fuel cell, preferably a solid oxide fuel cell, comprising a thin film electrolyte layer having a first surface and a second surface, the first surface being opposed to the second surface. A thick film anode layer is disposed on the first surface; and a thick film cathode layer is disposed on the second surface.

A method of making the fuel cell of the present invention comprises the step of creating a well in one side of a dielectric or semiconductor substrate. A thin film solid oxide electrolyte layer is deposited on the surface of the well. An electrode layer is applied in the electrolyte coated well. A counter well is created in the other side of the substrate, the counter well abutting the electrolyte layer. The method further comprises the step of applying a counter electrode layer in the counter well.

BRIEF DESCRIPTION OF THE DRAWINGS

Other objects, features and advantages of the present invention will become apparent by reference to the following detailed description and drawings, in which:

FIG. 13 is a cross sectional view of a further step in the present invention, showing the application of a thick film counter electrode in the counter well;

FIG. 14 is a semi-schematic top view of the invention shown in FIG. 13, depicting anode and cathode contact pads;

DETAILED DESCRIPTION OF THE PREFERRED EMBODIMENTS

Figure 1:
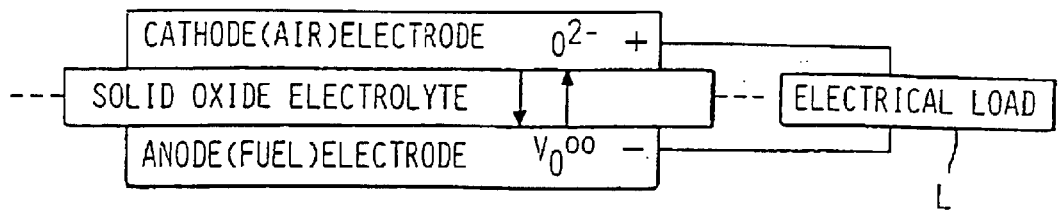
FIG. 1 is a schematic diagram of a basic solid oxide fuel cell structure.
Figure 2:
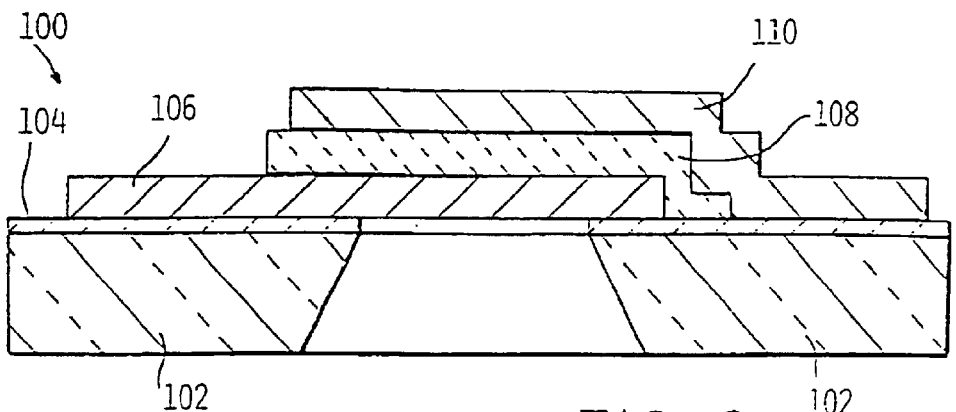
FIG. 2 is a cross sectional view of a prior art thin film solid oxide fuel cell structure.
Figure 3:
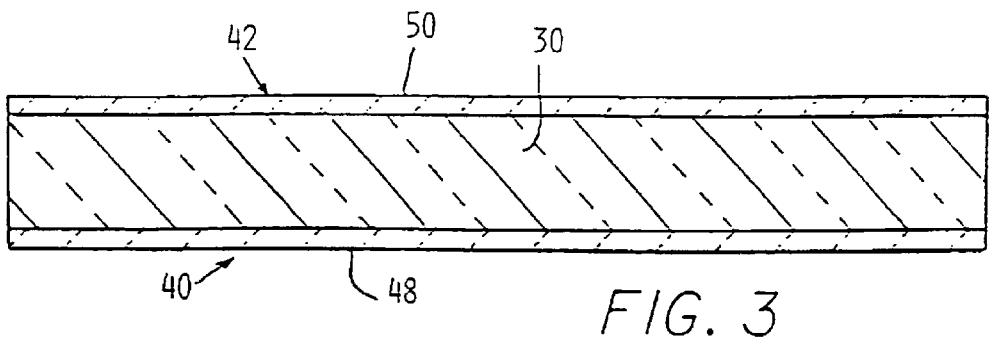
FIG. 3 is a cross sectional view of a preliminary step in the process of the present invention, showing a masking film on both sides of the substrate.

It is an object of the present invention to provide a solid oxide fuel cell with a thin film electrolyte in combination with both a thick film anode/fuel electrode and a thick film cathode/air electrode; thereby advantageously achieving lower operating temperatures and higher performance/ power densities. It is a further object of the present invention to provide a method for producing such a solid oxide fuel cell, which method advantageously incorporates process steps from the micro-electronics industry and is efficient and cost effective. Yet further, it is an object of the present invention to provide an integrated planar array of such a thin film/thick film solid oxide fuel cell, which planar array advantageously provides a simplified means for tailoring operating voltages of a fuel cell system.

It has been unexpectedly and fortuitously discovered in the present invention that, in sharp contrast to conventional SOFC, the SOFC of the present invention may exhibit high performance (eg. higher power densities than conventional PEM cells, and perhaps higher power densities than conventional high performing SOFC) at lower operating temperatures. Lower operating temperatures are quite desirable in that less expensive materials may be utilized as components of the SOFC. As a general rule, as the operating temperature rises, the more expensive the SOFC component materials become. However, conventionally (as discussed above) in order to take advantage of lower operating temperatures, higher performance had to be sacrificed.

Without being bound to any theory, it is believed that the inventive SOFC successfully achieves high performance at lower operating temperatures through the combination of thick film electrode materials to a thin film electrolyte. It is to be understood that "thin film" within the context of the present invention is defined to encompass thicknesses generally associated with the electronics/semiconductor industry, ie. thicknesses achievable with processes such as sputter deposition, for example from less than 1 $\mu$m to about 20 $\mu$m. Such thicknesses for a "thin" film SOFC electrolyte, although recognized in the literature, have heretofore not been reduced to commercial practice.

Thus, the SOFC of the present invention is a "hybrid" in the sense that the thin film electrolyte is formed by processes which have traditionally been used in the micro-electronics industry; eg. in the fabrication of integrated circuits; while the thick film electrodes are formed by traditional SOFC fabrication techniques. Some examples of these traditional SOFC processes include, but are not limited to Powder Press & Sinter, Powder Extrusion & Sinter, Colloid Suspension Spray or Dip Coating, Screen Printing, Slurry Method, Tape Casting, Tape Calendering, Plasma Spray Coating, Flame Spray Coating & Spray Pyrolysis, Electrochemical Vapor Deposition (EVD), Chemical Vapor Deposition (CVD), and the like.

It is to be understood that not all of these traditional thick film SOFC fabrication techniques may be suitable for use in the present invention. In the preferred embodiment, any desired thick film electrodes may be applied by processes including, but not limited to Colloid Suspension Spray or Dip Coating, Screen Printing, Slurry Method, Plasma Spray Coating, Flame Spray Coating & Spray Pyrolysis, and Chemical Vapor Deposition (CVD).

Referring now to FIG. 13, the hybrid thin film/thick film solid oxide fuel cell of the present invention is designated generally as 10. The solid oxide fuel cell (SOFC) 10 comprises a thin film electrolyte layer 12 having a first surface 14 and a second surface 16, the first surface 14 being opposed to the second surface 16. A thick film anode layer/fuel electrode 18 is disposed on the first surface 14; and a thick film cathode layer/air electrode 20 is disposed on the second surface 16.

It is to be understood that the thin film electrolyte layer 12 may have any thickness as desired and/or suitable for a particular end use, within the following parameters. The electrolyte layer 12 should ideally be as thin as possible, yet should be electronically insulating (only ionically conductive), impervious to gases, have enough dielectric strength to prevent short circuiting of the cell 10, and be thick enough to cover topographical irregularities thereby providing completeness of coverage to also prevent short circuiting of the cell 10.

In the preferred embodiment, the electrolyte layer 12 may have a thickness ranging from about less than 1 micron to about 20 microns. In a more preferred embodiment, the electrolyte layer 12 may have a thickness of less than about 10 microns. In a further preferred embodiment, the electrolyte layer 12 may have a thickness ranging between about 2 microns and about 5 microns.

It is to be understood that each of the thick anode 18 and cathode 20 layers may have any thickness as desired and/or suitable for a particular end use, within the parameters discussed herein. In contrast to some known SOFCs which promote electrode-supported SOFCs while keeping the counter electrode thin (as discussed hereinabove), it has been unexpectedly discovered in the present invention that it would be advantageous if both the anode 18 and the cathode 20 were thick and porous.

Some of the advantages of thick and porous (an interconnected porosity) electrodes include, but are not limited to the following. The thicker the electrode is, the greater the surface area is for desirable electrocatalytic reactions. This greater surface area, advantageously presenting a large three phase boundary area (simultaneous contact of reactant, electrode catalyst and electrolyte), is especially desirable for the anode/fuel electrode 18 at which internal reforming (and consequent production of hydrogen) and/or direct oxidation of fuel takes place; the larger surface advantageously results in the fuel cell being able to generate power without being unduly limited by the rate of production of hydrogen. The three phase boundary area is even larger if the material chosen for the electrode acts as a Mixed Electronic/Ionic Conductor (MEIC). Further, the porous thick film electrodes 18, 20 may be more desirable than known dense thin film electrodes because the fuel and oxidant may reach the electrolyte more efficiently (due at least in part to lower resistance for transport) than with dense thin film electrodes. Still further, thicker electrodes offer lower electrical parasitic losses.

In a preferred embodiment, each of the anode and cathode layers has a thickness greater than about 30 microns. In a further preferred embodiment, each of the anode and cathode layers has a thickness ranging between about 30 microns and about 500 microns. It is to be understood that, although anode 18 is depicted in FIG: 13 as being thicker than cathode 20, this is a non-limiting example. It is contemplated as being within the scope of the present invention to have an anode 18 and cathode 20 being equal or essentially equal in thickness one to the other, an anode 18 thinner than cathode 20, and so on, provided, however that both electrodes 18, 20 are thick as defined herein (ie. greater than about 30 microns).

The SOFC 10 of the present invention further comprises an anode layer 18 having an interconnected porosity ranging between about 19% and about 55%; and the cathode layer 20 has an interconnected porosity ranging between about 19% and about 55%. In a more preferred embodiment, each of the anode layer 18 interconnected porosity and the cathode layer 20 interconnected porosity ranges between about 20% and about 25%.

The chosen materials for the anode and/or the cathode (the materials are discussed in further detail hereinbelow) may be rendered with an interconnected porosity by any conventionally known process. A non-limitative example of such a process is to mix a suitable pore forming material, such as starches; suitable binders or polymers, and suitable solvents to form a ceramic paste/slurry. Then, in a two step thermal process, the binder and solvents are driven off, and the pore former is oxidized at high temperatures. Then, the material is sintered at temperatures typically greater than 1000°0 C., achieving solid state diffusion and the consolidation of the ceramic and/or metallic particles. This renders a material having an interconnected porosity. As is well known in the art, various process parameters may be varied in order to render a particular percentage of interconnected porosity.

It is to be understood that many suitable materials may be chosen for the various layers 12, 18, 20 (as well as for the interconnection and interfacial materials discussed hereinbelow). In the preferred embodiment, the electrolyte layer 12 comprises a material selected from the group consisting of yttria stabilized zirconia (YSZ) (between about 8 mol % and about 10 mol % $Y_2O_3$), samaria doped ceria (SDC, one example of its stoichiometric composition being $Ce_{0.8}Sm_{0.2}O_{1.9}$), partially stabilized zirconia (PSZ), stabilized bismuthsesquioxide ($Bi_2O_3$), tantalum pentoxide ($Ta_2O_5$), and lanthanum strontium gallium magnesium oxide (LSGM, one example of its stoichiometric composition being $La_{0.8}Sr_{0.2}Ga_{0.85}Mg_{0.15}O_{2.825}$).

In a more preferred embodiment, the electrolyte layer 12 consists essentially of $Ta_2O_5$ or lanthanum strontium gallium magnesium oxide (LSGM). In an alternate preferred embodiment, the electrolyte layer 12 consists essentially of YSZ or SDC.

In the preferred embodiment, the anode layer 18 comprises a material selected from the group consisting of nickel (Ni), Ni-yttria stabilized zirconia cermet (Ni-YSZ cermet), copper doped ceria, gadolinium doped ceria, strontium doped ceria, yttria doped ceria, Cu-YSZ cermet, Co-stabilized zirconia cermet, Ru-stabilized zirconia cermet, LSGM+nickel oxide, and mixtures thereof.

In the preferred embodiment, the cathode layer 20 comprises a material such as silver or the like, or a material having a perovskite structure. In the preferred embodiment, the cathode layer 20 comprises a material having a perovskite structure selected from the group consisting of lanthanum strontium manganate (LSM), lanthanum strontium ferrite, lanthanum strontium cobaltite (LSC), $LaFeO_3$/$LaCoO_3$, $YMnO_3$, $CaMnO_3$, $YFeO_3$, and mixtures thereof. LSC and LSM are more preferred cathode materials; while Ag is suitable but less preferred.

It is to be understood that either the cathode layer 20 and/or the anode layer 18 may be formed from a material which serves as a Mixed Electronic/Ionic Conductor (MEIC).

The fuel cell 10 of the present invention may further comprise a first interfacial layer 22, positioned between the anode 18 and the electrolyte 12; and a second interfacial layer 24 positioned between the cathode 20 and the electrolyte 12. It is to be understood that the interfacial layers 22, 24 may comprise any suitable materials which, desirably, provide buffering and/or interdiffusion barrier properties as well as serving as Mixed Electronic/Ionic Conductors (MEIC). In the preferred embodiment, the first interfacial layer 22 comprises yttria doped ceria (YDC, one example of its stoichiometric composition being $(Y_2O_3)_{0.15}(CeO_2)_{0.85}$)), and the second interfacial layer 24 comprises yttria stabilized bismuthsesquioxide (YSB, $Bi_2O_3$).

It is to be understood that the interfacial materials for layers 22, 24 may or may not be interchangeable. For example, Yttria Doped Ceria (YDC) has been reported to be used as a buffer at both the anode/electrolyte and the cathode/electrolyte interfaces.

The SOFC 10 of the present invention may further comprise a material 26, 26' for connecting the fuel cell 10 to an electrical load L and/or an electrical storage device (not shown), the connecting material 26, 26' deposited on at least one of the anode layer 18 and the cathode layer 20. It is to be understood that connecting layer 26, 26' may cover a portion of, or substantially all of the surface of the anode 18 and/or cathode 20. Layer 26, 26' may also cover a portion of, or substantially all of the electrolyte layer 12 on one opposed surface 40 of the substrate 30, and it may also cover a portion or substantially all of the isolation dielectric layer 46 on the other opposed surface 42 of the substrate 30. However, it is contemplated that if layer 26, 26' extends beyond the surface of the anode 18 and/or the cathode 20, the process for fabricating fuel cell 10 may need more than two masks (the process and masks 48, 50 are discussed further hereinbelow).

The electrical load L may comprise many devices, including but not limited to any or all of computers, portable electronic appliances (eg. portable digital assistants (PDAs), portable power tools, etc.), and communication devices, portable or otherwise, both consumer and military. The electrical storage device may comprise, as non-limitative examples, any or all of capacitors, batteries, and power conditioning devices. Some exemplary power conditioning devices include uninterruptable power supplies, DC/AC converters, DC voltage converters, voltage regulators, current limiters, etc. It is also contemplated that the SOFC 10 of the present invention may be suitable for use in the transportation industry, eg. to power automobiles, and in the utilities industry, eg. within power plants.

It is to be understood that the connecting material 26, 26' may comprise any suitable material, however, in the preferred embodiment, this connecting material has as a main component thereof a material selected from the group consisting of silver, palladium, platinum, gold, titanium, tantalum, chromium, iron, nickel, carbon, and mixtures thereof.

Figure 15:
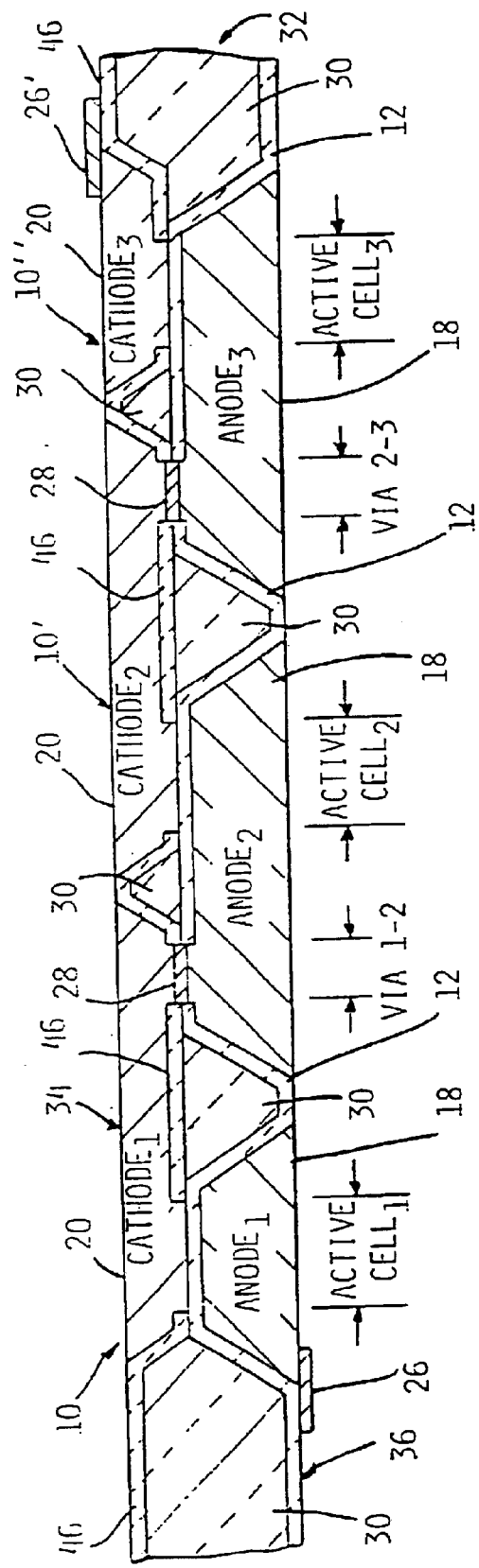
FIG. 15 is a cutaway cross sectional view of a planar array of several of the SOFCs of the present invention.

SOFC 10 may further comprise a material 28, 28' for interconnecting at least two of the hybrid thin film/thick film solid oxide fuel cells 10 (a planar array of cells 10 is shown in FIG. 15), the interconnecting material 28, 28' deposited on at least one of the anode layer 18 and the cathode layer 20.

The interconnecting material 28, 28' may be any suitable material. However, in the preferred embodiment, this material 28, 28' is selected from the group consisting of lanthanum chromites, nickel, copper, titanium, tantalum, chromium, iron, carbon, and mixtures thereof.

It is to be understood that the materials for the connecting layer 26, 26' may or may not be interchangeable with the materials for interconnecting layer 28, 28'.

Some additional materials which could be used as connecting materials 26, 26' and/or interconnecting materials 28, 28' include but are not limited to W (tungsten), stainless steels (if the operating temperatures are reduced enough), and high temperature nickel alloys, eg. some such alloys are commercially available under the tradenames INCONEL 600 and INCONEL 601 from International Nickel Company in Wexford, Pa., and HASTELLOY X and HA-230 from Haynes International, Inc. in Kokomo, Ind.

FIG. 14 is a semi-schematic top view of the fuel cell 10 shown in FIG. 13, showing anode contact pad 56 and cathode contact pad 58.

It is to be understood that any suitable fuel/reactant may be used with the SOFC 10 of the present invention. In the preferred embodiment, the fuel/reactant is selected from the group consisting of methane, butane, propane, pentane, methanol, ethanol, higher straight chain or mixed hydrocarbons (preferably low sulfur hydrocarbons, eg. low sulfur gasoline, low sulfur kerosine, low sulfur diesel), and mixtures thereof. In a more preferred embodiment, the fuel/ reactant is selected from the group consisting of butane, propane, methanol, pentane, and mixtures thereof. Suitable fuels should be chosen for their suitability for internal and/or direct reformation, suitable vapor pressure within the operating temperature range of interest, and like parameters.

It is contemplated as being within the purview of the present invention that a large number of fuel cells 10 may be formed by various combinations of the listed materials for layers 12, 18, 20. A larger number of fuel cells 10 may be formed by various combinations of the listed materials for layers 12, 18, 20 with any or all of the optional layers 22, 24, 26, 28. It is to be understood that such "mixing and matching" is within the scope of the present invention; however, it is preferred that the following guidelines be followed. It is preferred that there be mechanical compatibility between the chosen layers, eg. the layers should have substantially matched thermal coefficients. It is also preferred that there be chemical compatibility between the chosen layers, eg. there should be a lack of undesirable reactions during fabrication at elevated temperatures, there should be a lack of undesirable reactions in use, etc. It is further preferred that the chosen layers perform in the operating temperature range of interest. Further, it is preferred that the fuel(s) chosen perform within the operating temperature of interest.

Referring now to FIG. 15, an additional aspect of the present invention comprises a plurality of the hybrid thin film/thick film fuel cells 10, 10', 10" arrayed within a substrate 30. An electrical connection (either series and/or parallel) is provided between the plurality of anode layers 18; and an electrical connection (either series and/or parallel) is provided between the plurality of cathode layers 20.

FIG. 15 depicts a preferred embodiment of the array, wherein the plurality of fuel cells 10, 10', 10" are connected within a planar array 32, the planar array 32 having a first plane 34 adapted to contact a source of oxygen, the first plane 34 having a plurality of cathode layers 20 therein. The planar array 32 further has a second plane 36 opposed to the first plane 34, the second plane 36 adapted to contact a fuel (not shown), the second plane 36 having a plurality of anode layers 18. In the preferred embodiment, the source of oxygen is air.

Figure 16:
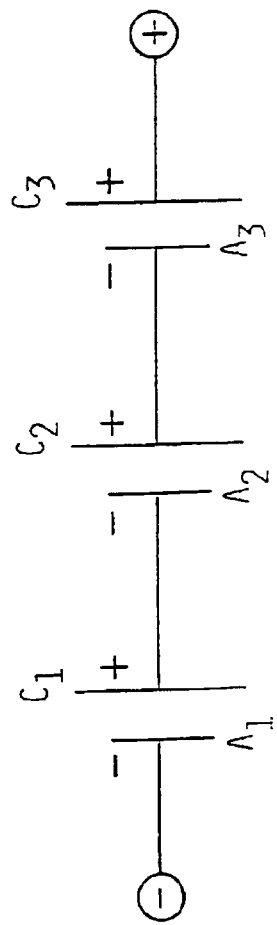
FIG. 16 is an electrical schematic diagram of the planar array shown in FIG. 15.

FIG. 16 is an electrical schematic diagram of the planar array 32 shown in FIG. 15.

The planar array 32 shown in FIG. 15 may be fabricated using a 7 mask process. Some advantages of planar array 32 include, but are not limited to the following. By fabricating a planar array in the manner shown, a complete practical series and/or parallel combination of cells (to obtain the desired output voltage/current operating characteristics) for a micropower application can be constructed on a single substrate, using common and established microelectronic fabrication techniques. This translates into a probable economic advantage over traditional 3-dimensional stacking approaches, as well as providing a great deal of design flexibility. Further, the planar array results in a simplified fuel and air manifolding system as a result of the anodes and cathodes all being on their own common side of a single substrate, as opposed to the configuration of a 3-dimensional stack. This simplified manifolding would eliminate the need for expensive bipolar plates and elaborate gas sealing schemes. Sealing problems have proven to be a substantial drawback for many known planar SOFC concepts. A lower electrical parasitic loss would be likely as a result of simplified interconnection between individual cells, as well as a simplified connection to the external load.

The fuel cell 10 of the present invention is high performing, and has quite desirable power densities. In a preferred embodiment, SOFC 10 has a power density of between about 100 mW/cm$^2$ and greater than about 2000 mW/cm$^2$. In a more preferred embodiment, the fuel cell 10 has a power density of between about 1000 mW/cm$^2$ and about 2000 mW/cm$^2$.

The fuel cell 10 preferably has an operating temperature of between about 400° C. and about 800° C. More preferably, the fuel cell 10 has an operating temperature of between about 400° C. and about 600° C. Still more preferably, the fuel cell 10 has an operating temperature of between about 400° C. and about 500° C.

The present invention advantageously provides power densities approximately 2 to 10 times that of PEM-based cells; the possibility of direct oxidation and/or internal reforming of fuel; and reduced SOFC operating temperatures.

Figure 5:
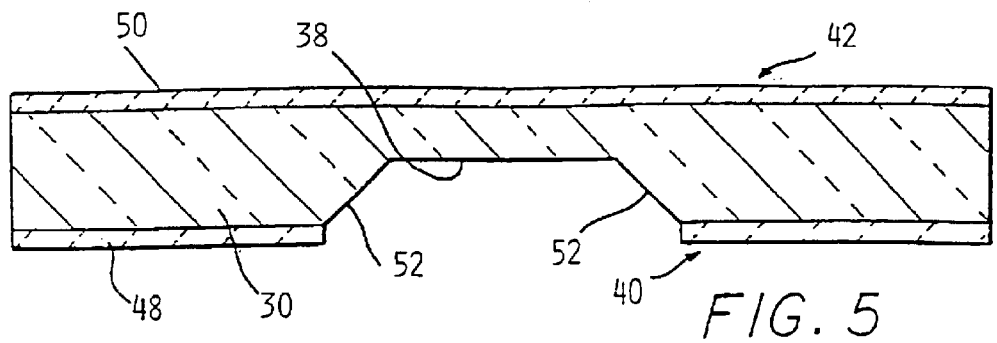
FIG. 5 is a cross sectional view of a further step in the present process, showing a well formed in the substrate material.
Figure 7:
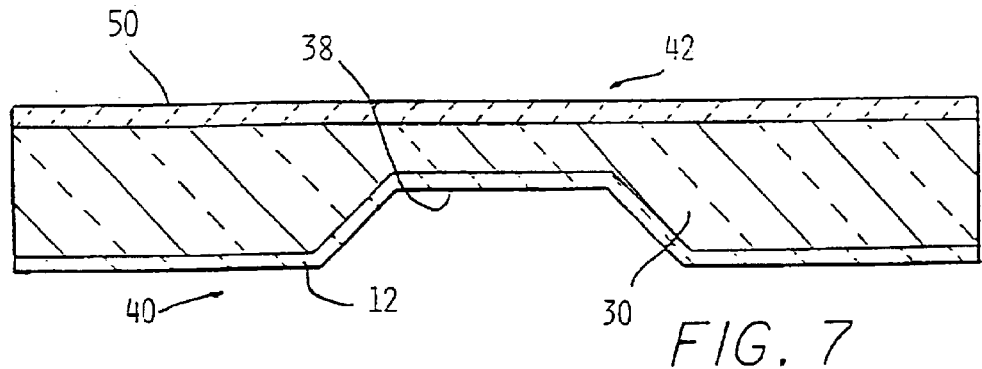
FIG. 7 is a cross sectional view of a further step in the present invention, showing the application of the thin solid electrolyte layer.
Figure 8:
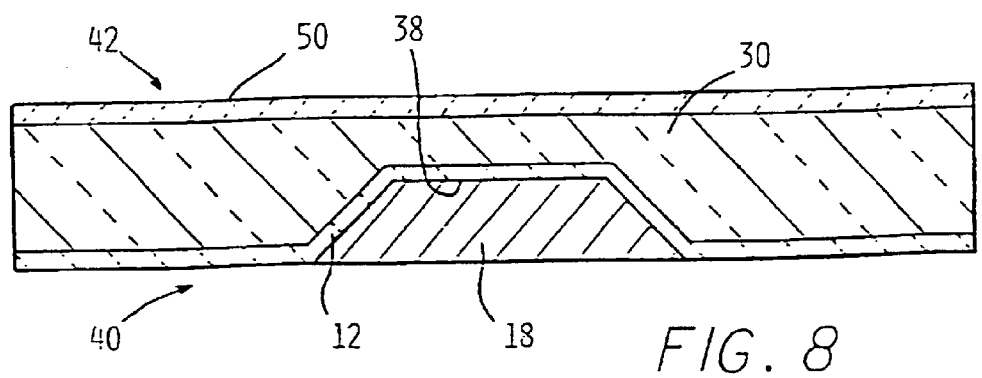
FIG. 8 is a cross sectional view of a further step in the present invention, showing the application of a thick film electrode in the well.
Figure 10:
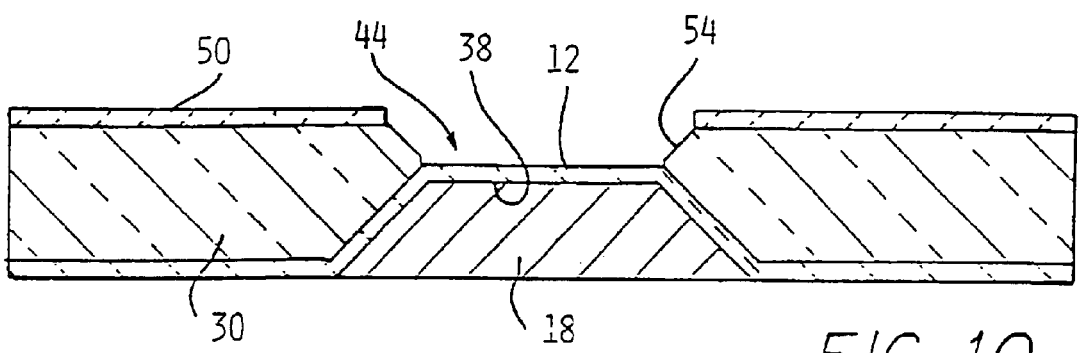
FIG. 10 is a cross sectional view of a further step in the present invention, showing a counter well formed in the opposite side of the substrate material.

A method of making the fuel cell 10 of the present invention comprises the step of creating a well 38 in a dielectric or semiconductor substrate 30, the substrate 30 having a first side 40 and a second side 42, the second side 42 opposed to the first side 40, and the well 38 being defined in the first side 40 (see FIG. 5). A thin film solid oxide electrolyte layer 12 is deposited on the surface of the well 38 (see FIG. 7). An electrode layer 18 is applied in the electrolyte 12 coated well 38 (see FIG. 8). A counter well 44 is created in the second side 42, the counter well 44 abutting the electrolyte layer 12 (see FIG. 10). The method of the present invention further comprises the step of applying a counter electrode layer 20 in the counter well 44 (see FIG. 13).

It is to be understood that, although the "electrode" is designated as anode layer 18, and the "counter electrode" is designated as cathode layer 20, these may be reversed; ie. "electrode" may be cathode layer 20, and "counter electrode" may be anode layer 18.

It is to be understood that the thin film electrolyte layer 12 may be deposited by any suitable means, however, in the preferred embodiment, the step of depositing the electrolyte layer 12 is performed by sputter deposition and/or chemical vapor deposition (CVD).

The method of the present invention may optionally further comprise the step of firing the electrolyte layer 12 prior to application of the electrode layer 18. This step may or may not be necessary. For example, if the electrolyte layer 12 can be sputter deposited at a high enough temperature, the firing step may be unnecessary. Further, a step of firing the electrodes 18, 20 may suffice for the electrolyte layer 12 also, thus rendering a separate electrolyte 12 firing step unnecessary.

Figure 12:
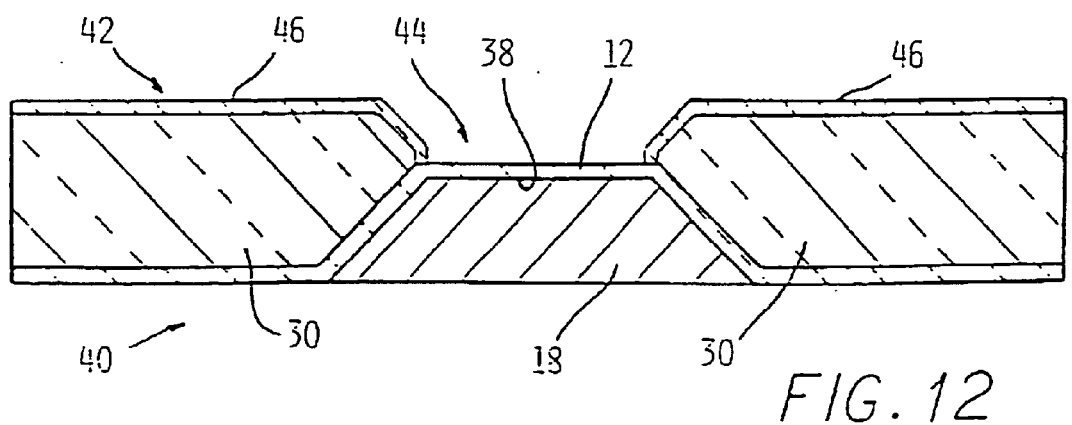
FIG. 12 is a cross sectional view of a further step in the present invention, showing an isolation dielectric on the substrate adjacent the counter well.

The method of the present invention further comprises the step of applying/depositing an isolation dielectric 46 on the second side 42 of the substrate 30 (see FIG. 12). Further, if the chosen substrate 30 is silicon, the isolation dielectric 46 may be grown on the second side 42 of the substrate 30.

It is to be understood that any suitable material may be chosen for the isolation dielectric 46; however, in the preferred embodiment, the isolation dielectric 46 material is selected from the group consisting of thermally grown silicon dioxide, plasma enhanced chemical vapor deposited (PECVD) silicon dioxide, PECVD silicon nitride, PECVD silicon carbide, low pressure chemical vapor deposited (LPCVD) silicon nitride, and mixtures thereof. In the preferred embodiment, the material of choice is thermally grown silicon dioxide, which is a self-masking/self-aligning oxide. In contrast, the deposited films may generally require the use of an additional masking level.

The method of the present invention may further comprise the step of processing the electrode layer 18 and the counter electrode layer 20 using planarization techniques. It is to be understood that any suitable planarization techniques may be used; however, in the preferred embodiment, the planarization is performed by chemical mechanical polishing (CMP) and/or mechanical polishing. The planarization is a method for advantageously confining the electrode layer 18 and the counter electrode layer 20 to the well 38 and the counter well 44, respectively. It is to be further understood that planarization processing of anode material 18 may be completed either before or after firing, or after a low temperature consolidation thermal step. Likewise, it is to be understood that planarization processing of cathode material 20 may be completed either before or after firing, or after a low temperature consolidation thermal step.

The method of the present invention may further comprise the step of applying/depositing a hard mask 48 to the first side 40 of the substrate 30 before the step of creating a well 38. The method of the present invention may also further comprise the step of applying/depositing a hard mask 50 to the second side 42 of the substrate 30 before the step of creating a counter well 44. If the substrate 30 is silicon (as depicted in the Figures), the hard masks 48, 50 may be grown on the substrate 30 first and second sides 40, 42. It is to be understood that any suitable masks 48, 50 may be used; however, in the preferred embodiment, the masks 48, 50 are selected from the group consisting of oxides, nitrides, carbides, and mixtures thereof. In a more preferred embodiment, the masks 48, 50 are selected from the group consisting of silicon oxides, silicon nitrides, silicon carbides, and mixtures thereof. Although less preferred, masks 48, 50 may comprise metallic hard masks.

It is to be understood that the well 38 and counter well 44 may be formed by any suitable means, including but not limited to etching and pressing. Pressing could generally be considered, for example, if a material such as alumina were chosen as the substrate 30, and if the substrate 30 were fabricated by pressing and sintering. In this case, well 38 could be formed by pressing during the substrate fabrication process.

In the preferred embodiment, the well 38 and counter well 44 are created by etching. If the substrate 30 is silicon, the etching may preferably be performed by an etchant selected from the group consisting of wet anisotropic etchants, plasma anisotropic etchants, and mixtures thereof. These etchants advantageously form ultra-smooth surfaces on the well 38 and the counter well 44.

It is to be understood that any suitable wet anisotropic etchants may be used, provided that they form the ultra-smooth surfaces as described herein. In the preferred embodiment, the wet anisotropic etchants are selected from the group consisting of potassium hydroxide (KOH), tetramethyl ammonium hydroxide (TMAH), a mixture of potassium hydroxide and isopropyl alcohol, ammonium hydroxide, sodium hydroxide, cerium hydroxide, ethylene diamine pyrocatechol and mixtures thereof. The wet anisotropic etchants advantageously form side walls 52, 54 of well 38, counter well 44 at opposed, outwardly extending angles, substantially as shown in the Figures (see, for example, FIGS. 5 and 10). These angular side walls 52, 54 may be advantageous for thermal expansion/contractions reasons.

Likewise, it is to be understood that any suitable plasma (dry) anisotropic etchants may be used, provided that they form the ultra-smooth surfaces as described herein. In the preferred embodiment, the plasma anisotropic etchant is an alternating application of sulfur hexafluoride, then $C_4F_8$. The $C_4F_8$ leaves a thin polymeric film on the etched surface, and especially on the side walls. The application of sulfur hexafluoride, then $C_4F_8$ is repeated until the desired etch is achieved.

The plasma anisotropic etchants may be desirable in that they are capable of forming very deep wells 38, 44. However, the plasma anisotropic etchants also form substantially vertical (not shown) side walls 52, 54, which may in some instances be undesirable for thermal expansion/contraction reasons, as well as for side wall coverage of electrolyte 12 and electrode 18, 20 materials (ie. it is difficult to coat substantially vertical walls).

In a less preferred embodiment, an isotropic etchant may be used on a silicon substrate 30. It is to be understood that any suitable isotropic etchant may be used; however, in the preferred embodiment, the isotropic etchant is a mixture of hydrofluoric acid, nitric acid and acetic acid. The isotropic etchants provide a curvilinear etch having semi-circular cross sections, however, a drawback is that the mask(s) may get undesirably undercut by the isotropic etchant.

If the substrate is a silicon oxide containing dielectric substrate, it is to be understood that the etching may be performed by any suitable isotropic etchant. In the preferred embodiment, the isotropic etchant comprises a hydrofluoric containing isotropic etchant.

It is to be understood that any suitable material for substrate 30 may be chosen. In the preferred embodiment, the substrate 30 is selected from the group consisting of single crystalline silicon, polycrystalline silicon, silicon oxide containing dielectric substrates, alumina, sapphire, ceramic, and mixtures thereof. Single crystal silicon is the substrate of choice in the preferred embodiment of the present invention.

It has unexpectedly and fortuitously been discovered by the present inventor that these ultra-smooth surfaces obtained by fabrication processes traditionally used in the micro-electronics industry allow for deposition of a very thin film electrolyte layer 12, substantially without risk of surface irregularities causing undesirable openings in the electrolyte layer 12.

In contrast, known SOFC fabrication processes deposit an electrolyte layer on a porous electrode. However, when a porous electrode is the substrate, there may be an uneven surface for the electrolyte layer, and there may be some invasion of the electrolyte material into the electrode as it is deposited. This may produce an uneven electrolyte layer, and often may require a thicker electrolyte layer to ensure that there is no gap in the electrolyte for air, fuel or gases to seep through.

There are further advantages from the method of the present invention. The electrolyte layer 12 is deposited (before either of the electrodes 18, 20) on a substantially non-porous substrate 30 (eg. a wafer of single crystal silicon) over the above-mentioned ultra-smooth well/counter well 38,44 surfaces. In addition to allowing for deposition of very thin electrolyte layers 12, it is believed that the ultra-smooth surfaces and the substantially non-porous substrate 30 may result in open-circuit voltages (OCV) close to theoretical values.

It is contemplated as being within the purview of the method of the present invention to form thin film electrodes 18, 20 within wells 38, 44, while retaining many, but not all of the advantages of the SOFC of the present invention. If such thin film electrodes 18, 20 are desired, they may be applied by any suitable technique, including but not limited to chemical vapor deposition or sputter deposition. As such, the well 38 and/or the counter well 44 may be adapted to contain either a thick film or a thin film electrode layer 18, 20. In one of the preferred embodiments of the present invention, wells 38, 44 are each adapted to contain thick film electrodes 18, 20.

Figure 4:
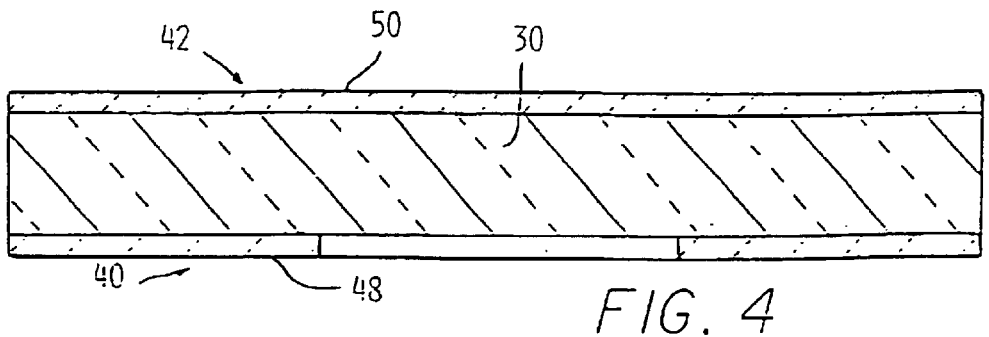
FIG. 4 is a cross sectional view of a further step in the present process, showing the masking film patterned on one side of the substrate.
Figure 6:
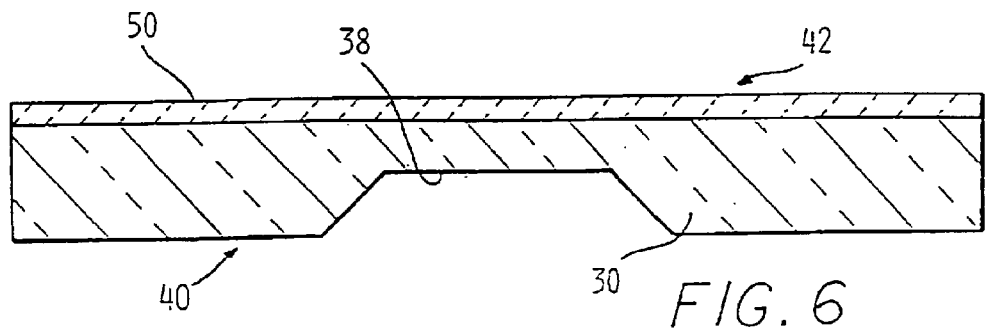
FIG. 6 is a cross sectional view of a further step in the present invention, showing the masking film removed from the substrate adjacent the well.

Referring now to FIG. 4, the method of the present invention may additionally comprise the step of patterning hard mask 48 on the first side 40 of substrate 30. using conventional photolithography and etch processes. FIG. 6 depicts dielectric hard mask 48 removed. Such removal is preferably accomplished by a one side plasma etch.

After application of electrode 18 into well 38, the electrode 18 may be fired. Likewise, after application of electrode 20 into well 44, the electrode 20 may be fired.

Figure 9:
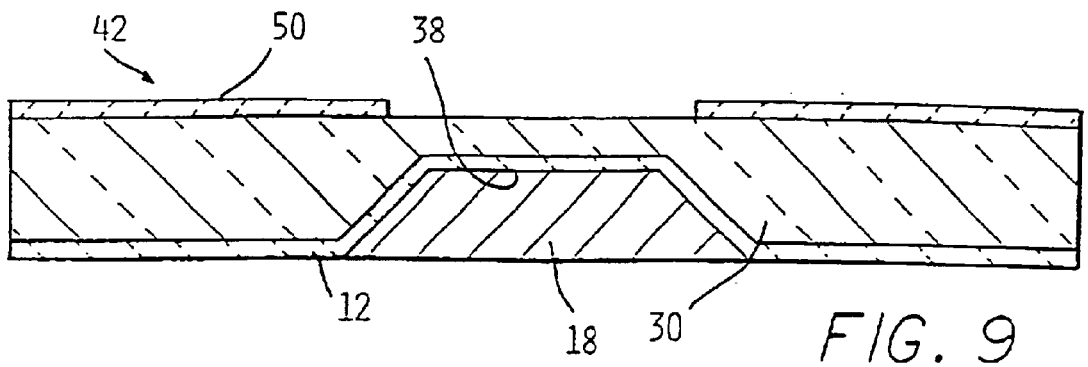
FIG. 9 is a cross sectional view of a further step in the present invention, showing the masking film patterned on the opposite side of the substrate.
Figure 11:
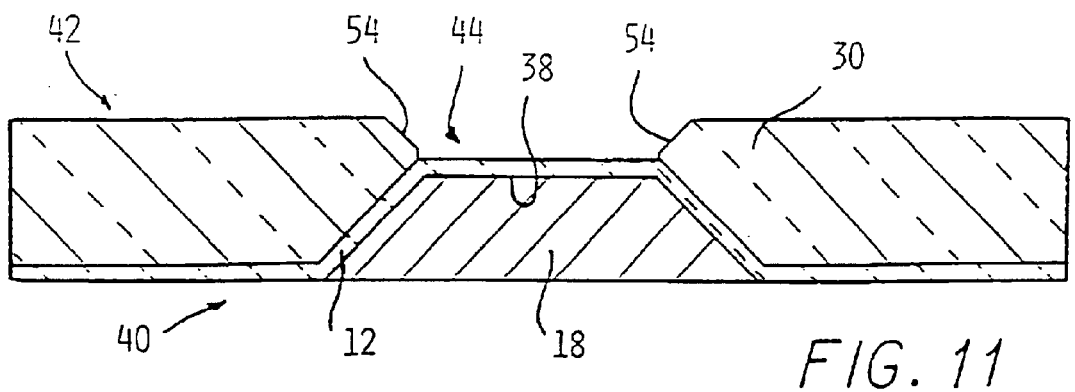
FIG. 11 is a cross sectional view of a further step in the present invention, showing the masking film removed from the substrate adjacent the counter well.

Referring now to FIG. 9, the method of the present invention may additionally comprise the step of patterning hard mask 50 on the second side 42 of substrate 30, using conventional photolithography and etch processes. FIG. 11 depicts dielectric hard mask 50 removed. Such removal is preferably accomplished by a one side plasma etch. Mask 50 may be left behind if desired.

Some further advantages of the present invention include, but are not limited to the following. The method of the present invention may advantageously be as low as a 2 mask process (as is depicted in FIGS. 3–13); whereas state of the art microprocessors generally use about a $\geq 25$ mask process. The use of higher performance anode/cathode materials from porous thick film media as set forth hereinabove lead to less polarization loss. The SOFC 10 of the present invention, as well as planar array 32 of the present invention provide for layout flexibility as well as scaleable layout schemes. Further, the process steps as described hereinabove do not need to progress in the exemplary order set forth—the inventive processing sequence may be advantageously altered and flexible, based upon etch selectivities and thermal history constraints. Further, since fuel cell 10 allows the opportunity for internal reforming reactions (which convert a hydrocarbon fuel to hydrogen and carbon monoxide), this advantageously allows for a diversity of fuel sources.

To further illustrate the present invention, the following example is given. It is to be understood that this example is provided for illustrative purposes, and is not to be construed as limiting the scope of the present invention.

EXAMPLE

The SOFC 10 of the present invention is fabricated using the following materials. La+Sr+Ga+Mg+O (LSGM)+NiO Cermet is chosen for the anode layer 18. An anode/electrolyte interfacial layer 22 is formed from Sm+Ce+O (SDC). La+Sr+Ga+Mg+O (LSGM) is chosen for the electrolyte layer 12. La+Sr+Co+O (LSC) is chosen for the cathode layer 20. This example of SOFC 10 is a low operating SOFC, with operating temperatures between about 600° C. and about 800° C.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method of making a fuel cell, the method comprising the steps of:
   creating a well in a dielectric or semiconductor substrate, the substrate having a first side and a second side, the second side opposed to the first side, and the well being defined in the first side;
   depositing a thin film solid oxide electrolyte layer on a surface of the well;
   applying an electrode layer in the electrolyte coated well;
   creating a counter well in the second side, the counter well abutting the electrolyte layer; and
   applying a counter electrode layer in the counter well.

2. The method as defined in claim 1 wherein the step of depositing the electrolyte layer is performed by at least one of sputter deposition or chemical vapor deposition (CVD).

3. The method as defined in claim 1, further comprising the step of firing the electrolyte layer prior to application of the electrode layer.

4. The method as defined in claim 1, further comprising the step of applying an isolation dielectric on the second side of the substrate.

5. The method as defined in claim 4 wherein the substrate is silicon, and wherein the isolation dielectric is grown on the second side of the substrate.

6. The method as defined in claim 1, further comprising the step of processing the electrode layer and the counter electrode layer using planarization techniques.

7. The method as defined in claim 6 wherein the planarization is performed by at least one of chemical mechanical polishing (CMP) or mechanical polishing.

8. The method as defined in claim 1, further comprising the step of applying a hard mask to the first side of the substrate before the step of creating a well.

9. The method as defined in claim 8 wherein the substrate is silicon, and wherein the first side hard mask is grown on the substrate first side.

10. The method as defined in claim 1, further comprising the step of applying a hard mask to the second side of the substrate before the step of creating a counter well.

11. The method as defined in claim 10 wherein the substrate is silicon, and wherein the second side hard mask is grown on the substrate second side.

12. The method as defined in claim 1 wherein the step of creating the well and the step of creating the counter well are each carried out by etching.

13. The method as defined in claim 12 wherein the substrate is silicon, and wherein the etching is performed by an etchant selected from the group consisting of wet anisotropic etchants, plasma anisotropic etchants, and mixtures thereof, thereby forming ultra-smooth surfaces on the well and the counter well.

14. The method as defined in claim 13 wherein the wet anisotropic etchants are selected from the group consisting of potassium hydroxide (KOH), tetramethyl ammonium hydroxide (TMAH), a mixture of potassium hydroxide and isopropyl alcohol, ammonium hydroxide, sodium hydroxide, cerium hydroxide, ethylene diamine pyrocatechol, and mixtures thereof.

15. The method as defined in claim 13 wherein the plasma anisotropic etchant is sulfur hexafluoride alternated with $C_4F_8$.

16. The method as defined in claim 12 wherein the substrate is a silicon oxide containing dielectric substrate, and wherein the etching is performed by a hydrofluoric containing isotropic etchant.

17. The method as defined in claim 1 wherein the substrate is selected from the group consisting of single crystalline silicon, polycrystalline silicon, silicon oxide containing dielectric substrate, alumina, sapphire, ceramic, and mixtures thereof.

18. The method as defined in claim 17 wherein the substrate is single crystalline silicon.

19. The method as defined in claim 1 wherein at least one of the electrode layer contained in the well or counter electrode layer contained in the counter well is a thick film electrode layer.

20. The method as defined in claim 19 wherein the electrode layer contained in the well is a thick film electrode layer and the counter electrode layer contained in the counter well is a thick film counter electrode layer.

21. A method of making a fuel cell, the method comprising the steps of:
creating a well in a dielectric or semiconductor substrate, the substrate having a first side and a second side, the second side opposed to the first side, and the well being defined in the first side;
depositing a thin film solid oxide electrolyte layer on a surface of the well, wherein the step of depositing the electrolyte layer is performed by at least one of sputter deposition or chemical vapor deposition (CVD);
applying an electrode layer in the electrolyte coated well;
creating a counter well in the second side, the counter well abutting the electrolyte layer, wherein the step of creating the well and the step of creating the counter well are each carried out by etching;
applying an isolation dielectric on the second side of the substrate;
applying a counter electrode layer in the counter well; and
processing the electrode layer and the counter electrode layer using planarization techniques, wherein the planarization is performed by at least one of chemical mechanical polishing (CMP) or mechanical polishing.

22. The method as defined in claim 21, further comprising the step of firing the electrolyte layer prior to application of the electrode layer.

23. The method as defined in claim 21 wherein the substrate is silicon, and wherein the isolation dielectric is grown on the second side of the substrate.

24. The method as defined in claim 21, further comprising the step of applying a hard mask to the first side of the substrate before the step of creating a well.

25. The method as defined in claim 24 wherein the substrate is silicon, and wherein the first side hard mask is grown on the substrate first side.

26. The method as defined in claim 21, further comprising the step of applying a hard mask to the second side of the substrate before the step of creating a counter well.

27. The method as defined in claim 26 wherein the substrate is silicon, and wherein the second side hard mask is grown on the substrate second side.

28. The method as defined in claim 21 wherein the substrate is silicon, and wherein the etching is performed by an etchant selected from the group consisting of wet anisotropic etchants, plasma anisotropic etchants, and mixtures thereof, thereby forming ultra-smooth surfaces on the well and the counter well.

29. The method as defined in claim 28 wherein the wet anisotropic etchants are selected from the group consisting of potassium hydroxide (KOH), tetramethyl ammonium hydroxide (TMAH), a mixture of potassium hydroxide and isopropyl alcohol, ammonium hydroxide, sodium hydroxide, cerium hydroxide, ethylene diamine pyrocatechol, and mixtures thereof.

30. The method as defined in claim 28 wherein the plasma anisotropic etchant is sulfur hexafluoride alternated with $C_4F_8$.

31. The method as defined in claim 21 wherein the substrate is a silicon oxide containing dielectric substrate, and wherein the etching is performed by a hydrofluoric containing isotropic etchant.

32. The method as defined in claim 21 wherein the substrate is selected from the group consisting of single crystalline silicon, polycrystalline silicon, silicon oxide containing dielectric substrate, alumina, sapphire, ceramic, and mixtures thereof.

33. The method as defined in claim 32 wherein the substrate is single crystalline silicon.

34. The method as defined in claim 21 wherein at least one of the electrode layer contained in the well or counter electrode layer contained in the counter well is a thick film electrode layer.

35. The method as defined in claim 34 wherein the electrode layer contained in the well is a thick film electrode layer and the counter electrode layer contained in the counter well is a thick film counter electrode layer.

* * * * *